United States Patent [19]

Butter et al.

[11] Patent Number: 4,606,899

[45] Date of Patent: Aug. 19, 1986

[54] SYNTHESIS OF MAXIMUM ALUMINUM X ZEOLITES

[75] Inventors: Stephen A. Butter; Steven M. Kuznicki, both of Allentown, Pa.

[73] Assignee: Air Products and Chemicals, Inc., Allentown, Pa.

[21] Appl. No.: 716,426

[22] Filed: Mar. 27, 1985

[51] Int. Cl.$^4$ .............................................. C01B 33/28
[52] U.S. Cl. .................... 423/328; 423/329; 423/118
[58] Field of Search ............... 423/328, 329, 118

[56] References Cited

U.S. PATENT DOCUMENTS

| | | | |
|---|---|---|---|
| 3,013,987 | 12/1961 | Castor et al. | 423/328 |
| 3,114,603 | 12/1963 | Howell | 23/113 |
| 3,321,272 | 5/1967 | Kerr | 423/328 |
| 3,647,718 | 3/1972 | Haden et al. | 423/328 |
| 3,949,059 | 4/1976 | Elliott, Jr. | 423/329 |
| 4,075,280 | 2/1978 | Fitton et al. | 423/328 |
| 4,094,778 | 6/1978 | Denney et al. | 210/38 A |
| 4,289,740 | 9/1981 | Estes | 423/328 |
| 4,406,822 | 9/1983 | Sanders et al. | 423/329 |
| 4,407,782 | 10/1983 | Estes | 423/328 |
| 4,534,947 | 8/1985 | Vaughan | 423/328 |

FOREIGN PATENT DOCUMENTS

| | | | |
|---|---|---|---|
| 1265727 | 4/1968 | Fed. Rep. of Germany | 423/328 |
| 2014451 | 4/1970 | France | 423/328 |
| 0043221 | 8/1969 | German Democratic Rep. | |
| 0058957 | 1/1970 | German Democratic Rep. | |
| 1035644 | 7/1966 | United Kingdom | 423/328 |
| 1051621 | 12/1966 | United Kingdom | 423/328 |
| 1223698 | 3/1971 | United Kingdom | 423/328 |
| 1580928 | 12/1980 | United Kingdom | |

*Primary Examiner*—John Doll
*Assistant Examiner*—Lance Johnson
*Attorney, Agent, or Firm*—Mark L. Rodgers; E. Eugene Innis; James C. Simmons

[57] ABSTRACT

Maximum aluminum X-type zeolite, useful as a water softening detergent builder, is produced by a relatively short term reaction at controlled temperature (on the order of 45°–75° C.) in a caustic meta kaolin reactant mixture.

19 Claims, No Drawings

SYNTHESIS OF MAXIMUM ALUMINUM X ZEOLITES

TECHNICAL FIELD

This invention pertains to specific forms of zeolite and to a practical process for making those zeolites.

BACKGROUND OF THE INVENTION

With rising concern over the use of phosphate builders in detergent mixtures and their effects upon the environment, the use of alternative water softening agents in detergents has increased. One common alternative is zeolite ($Na_2O.Al_2O_3.nSiO_2.xH_2O$), the synthetic forms of which are sometimes referred to as molecular sieves. Zeolite A is the most common commercially employed zeolite in detergent mixtures. Zeolite A is normally used in combination with another softening agent, such as the tri-sodium salt of nitrilotriacetic acid (NTA). Such a separate softening agent is needed to remove large hardness ions (i.e. hydrated magnesium and iron). Zeolite A is ineffective for this purpose due to its small pore size. In contrast, Maximum Aluminum X-type zeolite (having a Si:Al ratio of below 1.2) has a larger pore size (than zeolite A) and removes both large and small hardness ions from aqueous solution; therefore a secondary softening agent, such as NTA, may be unnecessary with Maximum Aluminum X-type zeolite, or may be required in lesser amounts.

The known prior art methods for preparation of "Reduced Silica" or "Low Silica" X-type zeolites (sometimes called LSX) are time-consuming or require unusual reaction conditions (such as high pressure) and are therefore impractical. Probably for these reasons, there has been no commercial use of LSX zeolite in detergents and little research into the use of similar zeolites such as Maximum Aluminum X-type zeolite, at least insofar as can be ascertained from the technical literature.

The known prior art comprises the following:

U.S. Pat. No. 4,094,778 teaches the combination of zeolite A and zeolite X as a detergent builder. In such a combination, the X-type zeolite is employed to scavenge the large hardness ions such as hydrated magnesium and iron while A-type zeolite efficiently removes calcium. A drawback of such an approach inheres in the low ion exchange capacity of standard (i.e., not Maximum Aluminum) X-type zeolites which necessitates increased total zeolite percentages in the detergent mixture.

British Pat. No. 1,580,928—Kuhl and Sherry—discloses the preparation of a large pore faujasite, (see definitions) referred to as "Low silica faujasite-type zeolite." This zeolite has a high ion exchange capacity (equal to A-type zeolites) and large pore size which enables it to exchange all significant hardness ions, including hydrated magnesium and iron ions. While the zeolite taught by British Pat. No. 1,580,928 would seemingly function well as a detergent builder, synthetic routes taught therein to produce the low-silica faujasite, appear to be commercially impractical.

According to the Kuhl and Sherry British Patent, low silica faujasite-type zeolite is produced by aging alumino silicate gels at temperatures generally below 45° C. for two to three days in a highly alkaline mixed $Na^+/K^+$ system. The aged mixture is subsequently crystallized at 60° to 100° C. The long precrystallative aging period is said to be important in the formulation of low-silica faujasite. Otherwise, it is indicated that immediate crystallization leads to the formation of high alumina content zeolite A. The general process description of Kuhl and Sherry suggests also the possibility of a single stage reaction to produce a predominantly low-silica faujasite product by holding the reaction mixture for several days at a temperature of below 50° C.

East German Pat. Nos. 43,221 and 58,957, to Wolf, both teach the synthesis of X-type zeolites from alumino silicate gels at 50°–100° C. in 7 to 10 hours, but there is little indication in these patents that the zeolite product is of the Maximum Aluminum variety. As in the Kuhl and Sherry British patent, the starting materials demonstrated by the East German patents to Wolf do not include clays or other inexpensive alumino silicate sources, but rather are synthetic aluminosilicate gels. According to Wolf, this may include sodium aluminate or aluminum oxide, sodium waterglass or silica sol, sodium hydroxide, potassium hydroxide and water. Wolf's product is indicated to be a "sodium/potassium X zeolite." Further, at the temperature given in the example of East German Pat. No. 43,221 (70°–75° C.), experimental work by the present inventors indicates an extremely high percentage yield of predominantly A-type zeolite, if clay derived reactants are employed. Attempts by the Applicants herein to directly convert meta kaolin at 60°, 70° and 80° C. under conditions comparable to those specified in the Wolf '221 patent have failed to produce high concentrations of Maximum Aluminum X-type zeolite in a variety of reaction mixtures.

U.S. Pat. Nos. 4,289,740 and 4,407,782 to Estes teach the synthesis of a high aluminum content zeolite HP from an aqueous solution of $Na_2O$, $Al_2O_3$, and $SiO_2$ at pressures of about 20,000 psig (138 MPa). Such zeolite HP is described by Estes as having ion exchange, catalytic, and absorptive properties which differ from known prior art X-type zeolites.

U.S. Pat. No. 3,114,603 to Howell teaches the synthesis of A-type zeolite from "reactive Kaolin-type clay material" by a two-step process similar to the digestion/crystallization taught by Kuhl and Sherry.

Definitions of Key Terms

Faujasites—A family of crystalline alumino silicate zeolites which includes the natural mineral faujasite as well as the synthetic A-, Y-, and X-type zeolites. Aside from minor compositional differences, these zeolites' structures include pore openings defined by 10 or 12 tetrahedral units of silicate and aluminate ions in a framework which controls the dimensions of the cages, cavities, and entrances or pores.

The common method by which truncated octahedra (sodalite units) are linked consists of 24 tetrahedra arranged in 6 4-rings or in 4 6-rings. Sodalite units linked by 4-rings give a pore size of about 0.42 nm, characteristic of the A-type zeolites, while linkage through 6-rings gives the 0.7 to 0.8 nm pore size of the X- and Y-type zeolites.

Kaolin—White, clay-like material with the approximate composition of the mineral Kaolinite—$[Al_4Si_4O_{10}][OH]_8$.

Kaolin is empirically similar to the minerals Dickite, and non-crystalline Halloysite.

Kaolin is the most refractory of all clays and is the highest commercial grade as classified by the U.S. Bureau of Mines. (Also called "China Clay")

Meta kaolin—Dehydroxylated form of Kaolin produced by heating at temperatures of 550° C. to 925° C. Metakaolin is X-ray amorphous but is presumed to retain some inherent structure.

SUMMARY OF THE INVENTION

According to one form of the process of the present invention, abundant and inexpensive calcined kaolin clay (see definitions), is directly converted to low coloration 1-50 uM aggregates of Maximum Aluminum X-type zeolite (quite suitable for use as a detergent builder) in 24 hours or less in one step by agitating a reaction mixture comprised of calcined clays, with sodium and potassium hydroxide, at about 50° C.

In the preferred form of the process of the present invention, kaolin clay, calcined at at least 700° C., is converted to a Maximum Aluminum X-type zeolite suitable for usage as a detergent builder in 8 hours or less by agitating a reaction mixture comprised of suitably calcined clays, with sodium and potassium hydroxide, at temperatures in excess of 50° C. and seeding said mixture with Maximum Aluminum X-type zeolite at a predetermined time after the reaction has been initiated.

DETAILED DESCRIPTION OF THE INVENTION

Mechanisms of zeolite formation are often undefined. However, there have been discerned relationships between zeolite A formation characteristics and Maximum Aluminum X-type zeolite formation characteristics which permit the present inventors to preferentially form Maximum Aluminum X-type zeolite from inexpensive starting materials under comparatively mild conditions, in relatively short time periods.

While Kuhl and Sherry produce low silica faujasite zeolites only after extended aging periods at temperatures of from 30°-50° C., the present inventors have discovered that suitably calcined clays, e.g., meta kaolin combined with caustic, preferably a mixture of sodium and potassium hydroxide, optionally seeded with 3-4 wt % essentially pure Maximum Aluminum X-type zeolite (with respect to clay in the mixture) yields a nearly quantitative conversion in 24 hours or less at 50° C. to essentially pure Maximum Aluminum X-type zeolite. Elevation of the reaction temperature to levels taught by Kuhl and Sherry (60°-100° C.) is not necessary. At temperatures up to 60° C., the product comprises predominantly Maximum Aluminum X-type zeolite. Below 50° C., down to about 45° C., Maximum Aluminum X-type zeolite is formed in significant amounts but at lower rates.

Crystallization at temperatures from 60° to 100° C. of an immediately seeded reaction mixture (prepared as above) yields a much higher percentage of zeolite A and/or feldspathoid hydroxysodalite rather than the desired Maximum Aluminum X-type zeolite.

It has also been discovered that a reduction in water content of the reaction mixture (to 50% of that suggested by Kuhl and Sherry in their alumino silicate gel reactant mixture) serves to both markedly increase the yield per unit reactor volume and, in addition, produce Maximum Aluminum X-type zeolite without the characteristic undesirable coloration of most clay-derived zeolites.

The extraordinary alkalinities represented by these reaction mixtures are generally associated with alumino silicate phases denser than zeolites.

Finally, it has been discovered that a delay in adding seed crystals to their preferred reaction mixture results in dramatic improvements in product purity. It is hypothesized that immediate addition of seed to an unsaturated alumino silicate solution results in dissolution of the seed crystals while delayed seeding allowed equilibration of the reactant mixture thereby reducing dissolution of the seed. This delayed seeding technique allows the preparation of Maximum Aluminum X-type zeolite from suitably calcined clays at temperatures substantially in excess of 50° C. and up to about 80° C. with a substantial reduction in conversion time.

Also to be noted is the discovery that the starting kaolin clay source must be calcined at a temperature in excess of 700° C. in order to synthesize substantially pure Maximum Aluminum-X-type zeolite. Kaolin calcined incompletely or at lower than 700° C. temperatures produced substantial quantities of a hydroxysodalite alumino silicate in admixture with the desired Maximum Aluminum X-type zeolite.

Integral to effective synthesis of maximum aluminum X-type zeolite is effective stirring of the reactant mixture, also in opposition to the quiescent synthesis conditions taught by the East German inventors. Stirring was shown to be required to produce the subject zeolite in relatively short periods of time required for commercial viability.

EXAMPLES

The prior art on the production of "Reduced Silica" X-type zeolites is devoid of mention of seeding as a mechanism to induce nucleation of appropriate alumino silicate gels and to thereby eliminate the extended aging period practiced in British Pat. No. 1,580,928. It has now been discovered, however, that appropriate alumino silicate gels may be seeded to induce the rapid formation of Reduced Silica X-type zeolites without the induction period required in prior art practices.

EXAMPLE 1 CONTROL

In a manner analogous to the methodology employed in the '928 patent, 23.5 grams of 50% aqueous NaOH was employed to solubilize 19.9 graxms Al(OH)$_3$ (59.8% Al$_2$O$_3$). In a separate container, 56.5 grams NaOH 50% aqueous solution was diluted with 179 cc deionized water. To this solution was added 21.2 grams (anhydrous based) KOH and 48.9 grams sodium silicate (8.9% Na$_2$O, 28.7% SiO$_2$). The two solutions were combined under agitation (at approximately 700 RPM), heated in a steam bath at 75° C. and left to react for four hours. The reaction mixture had the following overall composition:

| | |
|---|---|
| SiO$_2$/Al$_2$O$_3$ = | 2.0 |
| (Na$_2$O + K$_2$O)/SiO$_2$ = | 3.25 |
| Na$_2$O/(Na$_2$O + K$_2$O) = | 0.75 |
| H$_2$O/(Na$_2$O + K$_2$O) = | 20 |

Following filtration drying, the product was found to be essentially non-crystalline.

In principle, if nucleation were the key step in the formation of Reduced Silica X-type zeolite, seeding with any faujasitic zeolite at the appropriate point in the reaction would direct the synthesis toward the desired species. With clay-derived starting materials, using an equilibration or delay period, seeding is necessary to induce the formation of pure product.

EXAMPLE 2 (COMPARATIVE)

On the hypothesis that the equilibration period could be markedly reduced for presolubilized alumino silicate gels, immediate seeding of the reaction mixture was attempted.

A mixture identical to that used in Example 1 was prepared. Immediately after the reactants were combined, one gram of clay-derived Maximum Aluminum X-type zeolite was added with stirring and the seeded mixture was allowed to crystallize at 75° C. for four hours.

Analysis of the product indicated a highly crystalline phase which was estimated to be approximately 95% zeolite of the faujasite family by XRD powder pattern diffractometry. The relative intensities of the XRD powder pattern peaks were reminiscent of standard (as opposed to Maximum Aluminum) X-type zeolite and immediately and obviously differentiatable from Maximum Aluminum X-type zeolite.

Elemental analysis of this composition yielded a gross ratio Si/Al=1.04, well within the range of "Reduced Silica" X-type zeolite as taught by Kuhl and Sherry. Elemental analysis of the exchangeable cationic content of the sample (sodium, potassium, calcium, magnesium) balanced with the aluminum content of the zeolite such that the total eq. cation/eq. aluminum in the material=0.99+indicating that essentially all the aluminum present in the sample was present within the crystalline phase. Thus, the Si/Al ratio of 1.04 represented a maximum for the zeolite phase and the true Si/Al ratio wa less than or equal to 1.04.

An XRD unit cell constant ($a_0$) for this material of 25.03 Å was established and indicates an Si/Al ratio of approximately 1.0. Noting the XRD indication of faujasite content and the elemental ratios, combined with the reactant sources, it must be concluded that this material is the LSX previously disclosed in the '928 patent, and that seeding at elevated temperatures reduces the necessary preparation time by a full order of magnitude or more.

EXAMPLE 3 (COMPARATIVE)

In an attempt to substitute meta kaolin for the alumino silicate gels employed in British Pat. No. 1,580,928, 22.2 g of powdered meta kaolin clay was mixed into a solution of 39.0 g NaOH, 18.2 g (on an anhydrous basis) KOH and 234 cc $H_2O$ such that:

| | |
|---|---|
| $SiO_2/Al_2O_3 \approx$ | 2.0 |
| $(Na_2O + K_2O)/SiO_2 \approx$ | 3.25 |
| $NA_2O/(Na_2O + K_2O) \approx$ | 0.75 |
| $H_2O/(Na_2O + K_2O) \approx$ | 20.0 |

This mixture was aged for 72 hours (the optimal period reported in the patent), at 40° C. and crystallized for 8 hours at 100° C.

The product was sodium exchanged and subjected to powder pattern x-ray diffractometry for analysis. The peak area of the (hkl=664) was compared to the analogous peak of an NaX standard as one method to ascertain faujasite purity as suggested in the '928 patent. Noting the qualitatively different intensity ratios between LSX x-ray peaks and standard NaX peaks but also noting the comparability of overall pattern strengths, a summation of intensities of seven prominent peaks (hkl=111, 331, 440, 533, 642, 751 and 664) was used as a more reliable estimate of faujasite content. While more realistic than the method of the patent, a comparison of water capacity and cation exchange capacity measurements conducted on selected samples infer that this summation technique is conservative in indicated faujasite content, by approximately 5% (relative).

Analysis of the product revealed:

| Faujasite Content (percent) | | |
|---|---|---|
| Seven Peak Summation | hkl = 664 | Contaminants |
| 40 | 55 | Approximately 25% A |

Although the '928 patent suggests the use of clays as a source material, the process is entirely unsatisfactory when used with meta kaolin.

EXAMPLE 4 (COMPARATIVE)

To investigate the possibility that meta kaolin might behave in a qualitatively different manner from the alumino silicate gels of the British patent, the precrystallative aging period of a battery of samples of the composition of Example #3 were subjected to aging at 40° C. for 72 to 168 hours in 8 hour increments. An optimum aging period of 120 hours was observed, with longer or shorter aging giving measurably poorer products. At this optimum 120 hour aging period (followed by 8 hours, 100° C. crystallization) x-ray analysis of the product revealed:

| Faujasite Content (percent) | | |
|---|---|---|
| Seven Peak Summation | hkl = 664 | Contaminants |
| 75 | 95 | Approximately 10% A |

This series of experiments revealed that there is a substantial qualitative difference between the behavior of alumino silicate gels of the '928 patent and meta kaolin a used in the instant invention.

EXAMPLE 5 (COMPARATIVE)

In an attempt to substitute meta kaolin for the alumino silicate gels employed in E. German Pat. No. 43,331, 22.2 g of powdered meta kaolin was mixed into a solution of 31.7 g NaOH, 16.7 (on an anhydrous basis) KOH and 165 cc $H_2O$ such that:

| | |
|---|---|
| $SiO_2/Al_2O_3 \approx$ | 2.0 |
| $(Na_2O + K_2O)SiO_2 \approx$ | 2.75 |
| $Na_2O/(Na_2O + K_2O) \approx$ | 0.72 |
| $H_2O/(Na_2O + K_2O) \approx$ | 16.7 |

While the aforementioned patent was vague as to reactant ratios, this mixture represented the present inventors' best interpretation of the data provided and is well within the compositional limits claimed. This mixture was treated without stirring at ~72° C. for 7 hours as described in E. German Pat. No. 43,221. Analysis of the product by the previously described methods revealed:

| Faujasite Content (percent) | | |
|---|---|---|
| Seven Peak Summation | hkl = 664 | Contaminants |
| 0 | 0 | no crystalline |

| Faujasite Content (percent) | | |
|---|---|---|
| Seven Peak Summation | hkl = 664 | Contaminants |
| | | prod. |

Clearly, the methods taught by the '221 and '331 patents are inapplicable to meta kaolin systems and result in no faujasite product.

EXAMPLE 6 (COMPARATIVE)

The inventors in E. German Pat. No. 43,221 specifically discounted the effects of agitation in the preparation of mixed Na/K faujasite. To investigate the applicability of this generalization to meta kaolin systems, a mixture identical to Example 5 was prepared and reacted under identical conditions with the exception of mechanical stirring (rotor and 200–250 rpm) for the 7 hour crystallization period. Unlike the noncrystalline product obtained statically, analysis of this sample revealed:

| Faujasite Content (percent) | | |
|---|---|---|
| Seven Peak Summation | hkl = 664 | Contaminants |
| 35 | 55 | Approximately 30% A |

EXAMPLES 7–12 (COMPARATIVE)

To demonstrate the effect of absence of agitation, reaction mixtures identical composition to Example #3 were prepared and treated at 50° C. for varying lengths of time. Analysis of the products revealed:

| Example | Reaction Time (hours) | Faujasite Content (%) Seven Peak Summation | hkl = 664 | Contaminants |
|---|---|---|---|---|
| 7 | 24 | 0 | 0 | No crystalline product |
| 8 | 48 | 0 | 0 | |
| 9 | 72 | 20 | 25 | No observed contaminants |
| 10 | 96 | 70 | 90 | Trace (~2%) A zeolite |
| 11 | 120 | 85 | 110 | |
| 12 | 144 | 85 | 110 | |

These examples demonstrate that Maximum Aluminum X-type Zeolites may be prepared in one ste at 50° C. from meta kaolin, given sufficient time, even without agitation. A classic pattern of an induction period followed by a relatively rapid rise to a stable product is observed. Analysis of the hkl=664 peak indicates purity at least as high as those suggested by Kuhl and Sherry in the prior art using extended precrystallative aging. Unlike the prior art, virtually contaminant-free product was obtainable at 50° C. However, a multiday process was necessary for product formation.

EXAMPLES 13 and 14

In accordance with the present invention, the basicity of the reactant medium was elevated by reduction of the water content in Example #3. 22.2 g of meta kaolin was mixed with 39.0 g NaOH and 18.2 g (on an anhydrous basis) KOH in 117 cc H$_2$O such that:

| | |
|---|---|
| SiO$_2$/Al$_2$O$_3$ ≅ | 2.0 |
| (Na$_2$O + K$_2$O)/SiO$_2$ ≅ | 3.25 |
| Na$_2$O/(Na$_2$O + K$_2$O) ≅ | 0.75 |
| H$_2$O/(Na$_2$O + K$_2$O) ≅ | 10 |

This mixture was mechanically agitated at 50° C. for 24 hours. Analysis of the product revealed:

| Faujasite Content (percent) | | |
|---|---|---|
| Seven Peak Summation | hkl = 664 | Contaminants |
| 80 | 100 | Trace unknown |

EXAMPLE 14

A mixture identical to the previous Example #11 was prepared and reacted for 24 hours with the exception being the addition of 1.1g of high purity LSX seed crystals (obtained from prolonged 50° C. processing). The product formed was analyzed as:

| Faujasite Content (percent) | | |
|---|---|---|
| Seven Peak Summation | hkl = 664 | Contaminants |
| 90 | 110 | Trace unknown |

Clearly, high purity Maximum Aluminum X-type zeolite can be prepared in less than the extended period taught by British Pat. No. 1,580,928 by using the present invention.

EXAMPLE 15–22

A series of reactant mixtures of the composition of Example 13 was prepared. These samples were reacted, with agitation, at 65° C. for a period of 6 hours. (In Example 15, no seeding was added and thus technically, the mixture seems to be within the compositional limits of E. German Pat. No. 43,221.) Analysis of the product revealed:

| Faujasite Content (percent) | | |
|---|---|---|
| Seven Peak Summation | hkl = 664 | Contaminants |
| 0 | 0 | High level of the feldspathoid hydroxysodalite |

To the mixtures in Examples 16–22, seeding was added in the same proportion as Example #14. The seed crystals were immediately added to the reactant mixture of Example 16 and added with the seeding delay times as indicated for Examples 17 through 22. Clearly, at 65° C. a delay of 40–45 minutes produced the highest concentration of highly pure maximum aluminum X zeolite in a total reaction period of six hours. Analysis of the products revealed:

| Faujasite Content (percent) | | |
|---|---|---|
| Seven Peak Summation | hkl = 664 | Contaminants |
| 70 | 85 | None observed |

| Example | Seeding Delay (mins.) | Faujasite Content (%) Seven Peak Summation | hkl = 664 | Contaminants |
|---|---|---|---|---|
| 17 | 10 | 85 | 95 | None |
| 18 | 20 | 85 | 100 | None |
| 19 | 30 | 90 | 110 | None |
| 20 | 40 | 95 | 120 | None |
| 21 | 50 | 95 | 110 | None |
| 22 | 60 | 95 | 100 | None |

EXAMPLE 23

A scale-up of the delayed seeding approach was conducted by the addition of 3 Kg of meta kaolin to a solution of 5,270 g NaOH and 2,450 g (anhydrous basis) KOH in 15.8 l of $H_2O$. The mixture was allowed to equilibrate to 65° C. for ~45 minutes, at which time 150 g of LSX seed crystals was added. A sample was withdrawn at 6 hours (total reaction time) and found to be identical to the bulk of the sample which was left for an additional 2 hours to ascertain product stability at these high alkalinities. The sample was analyzed as:

| Faujasite Content (percent) | | |
|---|---|---|
| Seven Peak Summation | hkl = 664 | Contaminants |
| 95 | 110 | None |

A water capacity in excess of 31.5 wt % (on a dry basis) confirms the high product purity (compare to Kuhl and Sherry). Confirmation of Product: An XRD unit cell constant of 25.03 Å was observed for the product of Example #23. This is consistent with the anticipated (but heretofore unreported) unit cell constant for a pure NaLSX with a Si/Al ratio of 1.0. Elemental analysis also gave a 1.0 Si/Al ratio for the gross product.

EXAMPLES 24-31

In an attempt to apply the delayed seeding technique to further reduce reaction time, an additional series of reactant mixtures of the composition of Example 13 were prepared. These samples were reacted, with agitation, at 75° C. for a period of 4 hours. (Again, as in Example 15, Example 24 had no seeding added and thus the mixture seemed to be within the compositional limits of E. German Pat. No. 43,221.) Analysis of the product revealed:

EXAMPLE 24

| Faujasite Content (percent) | | |
|---|---|---|
| Seven Peak Summation | hkl = 664 | Contaminants |
| 0 | 0 | High level of the feldspathoid hydroxysodalite |

EXAMPLES 25-31

To the mixtures in Examples 25-31, seeding was added in the same proportion as Example #14.

| Example | Seeding Delay (mins.) | Faujasite Content (%) Seven Peak Summation | hkl = 664 | Contaminants |
|---|---|---|---|---|
| 25 | 0 | 10 | 5 | Hydroxysodalite |
| 26 | 5 | 40 | 40 | Some Hydroxysodalite |
| 27 | 10 | 95 | 110 | Possible Trace Hydroxysodalite |
| 28 | 15 | 85 | 90 | Trace Hydroxysodalite |
| 29 | 20 | 75 | 90 | Trace Hydroxysodalite |
| 30 | 25 | 55 | 60 | Some Hydroxysodalite |
| 31 | 30 | 50 | 55 | Some Hydroxysodalite |

This series of experiments (Examples 24-31), conducted at a 75° C. with agitation for a period of 4 hours attempts to optimize the conditions for delayed seeding time. At this elevated temperature, ca. 10 minutes (Example 27) gave high yields of pure maximum aluminum X-type zeolite whereas ca. 40 minutes was required at 65° C. (Example 20). When seed crystals were added at times prior or subsequent to those described as optimum, some reduction in yields was found.

While the XRD patterns of both the LSX synthesized in Example 2 and Maximum Aluminum X-type zeolites clearly indicate that they are both members of the faujasite family of zeolites, (similar to the case of zeolites X and Y) qualitative differences in the spectrum clearly differentiate these species. This difference in XRD spectrum is clear from the comparative ordering of the strongest peak intensities of LSX and Maximum Aluminum X-type zeolite as listed below.

| Order of XRD Peak Intensities | LSX (Associated Miller Index) (hkl) | MAX* |
|---|---|---|
| 1 | 111 | 111 |
| 2 | 533 | 751 |
| 3 | 751 | 642 |
| 4 | 642 | 533 |
| 5 | 220 | 331 |

*Maximum Aluminum X-type zeolite

These conspicuous differences, combined with the equivalence of these materials on an elemental and unit cell constant basis, indicate that these materials represent related but different zeolite species (analogous to the related faujasites X and Y).

While this invention has been described with reference to specific examples, it will nonetheless be understood by those skilled in the art that other variations of process conditions ard parameters may be employed without departing from the true spirit of the invention. It is intended that the claims which follow should be construed to encompass all such variations.

STATEMENT OF INDUSTRIAL UTILITY

The present invention comprises a synthetic zeolite and a method for making it. The zeolite is useful in water softening, ion exchange, and other molecular sieve applications.

We claim a our invention:

1. A process for the synthesis of Maximum Aluminum X-type zeolite comprising the steps of:

(a) forming a mixture of from 2% to 50% calcined kaolin clays, said clays having a silicon to aluminum ratio of from 0.75:1 to 1.15:1, about 5% to 50% sodium and/or potassium hydroxide, and 40% to 90% water (all by weight);
(b) agitating said mixture at between about 45° C.–60° C. for about 1 to 24 hours; and
(c) recovering Maximum Aluminum X-type zeolite as a product.

2. A process, as recited in claim 1, wherein said mixture includes from 5% to 30% sodium hydroxide and from 3% to 15% potassium hydroxide.

3. A process, as recired in claim 1, wherein said clays are calcined at a temperature above 700° C.

4. A process as recited in claim 1 wherein the mixture formed in step (a) is immediately seeded with Maximum Aluminum X-type zeolite.

5. Maximum Aluminum X-type zeolite synthesized by the process comprising the steps of:
(a) forming a mixture of from 2% to 50% calcined kaolin clays, said clays having a silicon to aluminum ratio of from 0.75:1 to 1.15:1, about 5% to 50% sodium and/or potassium hydroxide, and 40% to 90% water (all by weight);
(b) agitating said mixture at between about 45° C.–60° C. for about 1 to 24 hours; and
(c) recovering Maximum Aluminum X-type zeolite as a product.

6. Maximum Aluminum X-type zeo-lite, synthesized by the process recited in claim 5, wherein said mixture includes from 5% to 30% sodium hydroxide and from 3% to 5% potassium hydroxide.

7. Maximum Aluminum X-type zeolite, synthesized by the process recited in claim 6, wherein said clays are calcined at a temperature above 700° C.

8. Maximum Aluminum X-type zeolite, synthesized by the process recited in claim 5, wherein the mixture formed in step (a) is immediately seeded with Maximum Aluminum X-type zeolite.

9. A process for the synthesis of Maximum Aluminum X-type zeolite comprising the steps of:
(a) forming a mixture of from 2% to 50% calcined kaolin clays, said clays having a silicon to aluminum ratio of from 0.75:1 to 1.15:1, about 5% to 50% zodium and/or potassium hydroxide, and 40% to 90% water (all by weight);
(b) agitating said mixture at a temperature between 50° C.–0 80%C for 0.5 hours to 12 hours;
(c) seeding the mixture with Maximnm Aluminum X-type zeolite 1 to 120 minutes after forming said mixture in step (a) and
(d) recovering Maximum Aluminum X-type zeolite as product.

10. A process, as recited in either of claims 4 and 9 wherein said mixture is seeded by addition of from 0.1% to 25% by weight (relative to clay) Maximum Aluminum Xtype zeolite.

11. A process, as recited in either of claims 4 and 9 wherein said mixture is seeded by addition of from 1% to 10% by weight (relative to clay) Maximum Aluminum X-type zeolite.

12. A process, as recited either of claims 4 and 9 wherein said mixture is seeded by addition of from 2% to 5% by weight (relative to clay) Maximum Aluminum X-type zeolite.

13. The process of one of claims 1, 2, 4 and 9 wherein said Maximum Aluminum X-type zeolite is recovered as substantially spherical aggregates of 0.1–100 uM diameter.

14. The process of one of claims 1, 2, 4 and 9 wherein said Maximum Aluminum X-type zeolite is recovered as substantially spherical aggregates of 0.5–50 uM diameter.

15. Maximum Aluminum X-type zeolite synthesized by the process comprising the steps of:
(a) forming a mixture of from 2% to 50% calcined kaolin clays, said clays having a silicon to aluminum ratio of from 0.75:1 to 1.15:1 about 5% to 50% sodium and/or potassium hydroxide, and 40% to 90% water (all by weight)'
(b) agitating said mixture at a temperature between 50° C.–80° C. for 0.5 hours to 12 hours;
(c) seeding the mixture with Maximum Aluminum X-type zeolite 1 to 120 minutes after forming said mixture in step (a) and
(d) recovering Maximum Aluminum X-type zeolite as product.

16. Maximum Aluminum X-type zeolite, synthesized by the process recited in either of claims 8 and 15 wherein said mixture is seeded by addition of from 0.1% to 25% by weight (relative to clay) Maximum Aluminum X-type zeolite.

17. Maximum Aluminum X-type zeolite, synthesized by the process recited in either of claims 8 and 15, wherein said mixture is seeded by addition of from 1% to 10% by weight (relative to clay) Maximum Aluminum X-type zeolite.

18. Maximum Aluminum X-type zeolite, synthesized by the process recited in either of claims 8 and 15 said mixture is seeded by addition of from 2% to 5% by weight (relative to clay) Maximum Aluminum X-type zeolite.

19. An improved ion-exchange capacity zeolite, said zeolite having:
(a) A Silicon to Aluminum ratio of from 1.0 to 1.2;
(b) A unit cell constant ($a_0$) of about 25.0 Å;
(c) An X-ray powder diffraction pattern characterized by having at least the following five peaks

| Order of XRD Peaks | hkl |
|---|---|
| 1 | 111 |
| 2 | 751 |
| 3 | 642 |
| 4 | 533 |
| 5 | 331 |

* * * * *